United States Patent
Panchaksharaiah et al.

(10) Patent No.: US 10,929,886 B2
(45) Date of Patent: Feb. 23, 2021

(54) SYSTEMS AND METHODS FOR PERSONALIZED TIMING FOR ADVERTISEMENTS

(71) Applicant: Rovi Guides, Inc., San Carlos, CA (US)

(72) Inventors: Vishwas Sharadanagar Panchaksharaiah, Karnataka (IN); Vikram Makam Gupta, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 177 days.

(21) Appl. No.: 15/399,232

(22) Filed: Jan. 5, 2017

(65) Prior Publication Data

US 2018/0189837 A1 Jul. 5, 2018

(51) Int. Cl.
- *G06Q 30/02* (2012.01)
- *G06Q 50/00* (2012.01)
- *H04L 29/08* (2006.01)

(52) U.S. Cl.
CPC ..... *G06Q 30/0264* (2013.01); *G06Q 30/0269* (2013.01); *G06Q 30/0272* (2013.01); *G06Q 50/01* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 8,726,312 | B1* | 5/2014 | Hewinson | H04N 21/4532 725/34 |
| 9,736,503 | B1* | 8/2017 | Bakshi | H04N 21/262 |
| 2007/0204310 | A1* | 8/2007 | Hua | H04N 21/812 725/88 |
| 2008/0281689 | A1 | 11/2008 | Blinnikka et al. | |
| 2009/0094113 | A1 | 4/2009 | Berry et al. | |
| 2012/0158492 | A1* | 6/2012 | Ye | G06Q 30/0241 705/14.49 |

(Continued)

OTHER PUBLICATIONS

"An Efficient Ad Recommendation System for TV Programs" (Sudha Velusamy, Shalabh Bhatnagar, Lakshmi Gopal, and V. Sridhar; published in "Multimedia Systems" in Jul. 2008) (Year: 2008).*

(Continued)

*Primary Examiner* — James M Detweiler
(74) *Attorney, Agent, or Firm* — Haley Guiliano LLP

(57) ABSTRACT

Systems and methods are provided herein for determining personalized timing for generating for display advertisements to users. Rather than an expert determining time segments of a media asset most suitable for presenting advertisements to users, the most suitable time segments in a media asset for presenting advertisements to users may be customized based on a user's profile information and/or the user's level of engagement in a media asset. The media guidance application may parse a media asset into multiple time segments and determine one or more time segments associated with metadata that matches content characteristics preferred by the user. One or more advertisements may be presented to the user in these time segments determined by the media guidance application instead of the time segments determined by the expert.

18 Claims, 6 Drawing Sheets

(56) References Cited

U.S. PATENT DOCUMENTS

| | | | |
|---|---|---|---|
| 2014/0172579 A1* | 6/2014 | Peterson | G06Q 30/0269 705/14.66 |
| 2015/0317686 A1 | 11/2015 | Tang et al. | |
| 2016/0378276 A1 | 12/2016 | Shah | |
| 2017/0118515 A1* | 4/2017 | Dey | H04N 21/812 |
| 2017/0213243 A1* | 7/2017 | Dollard | G06Q 30/0249 |
| 2018/0189398 A1* | 7/2018 | Sternberg | G06F 3/015 |

OTHER PUBLICATIONS

International Search Report and Written Opinion dated Oct. 17, 2017 for PCT Application No. PCT/US2017/049180, filed Aug. 29, 2017, 12 pages.

* cited by examiner

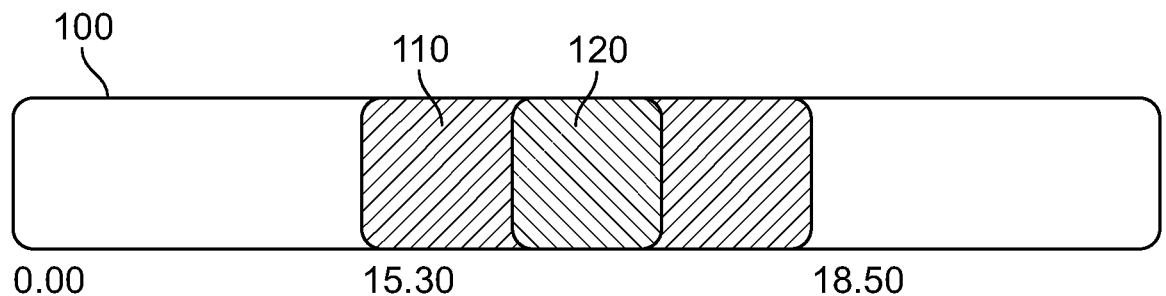
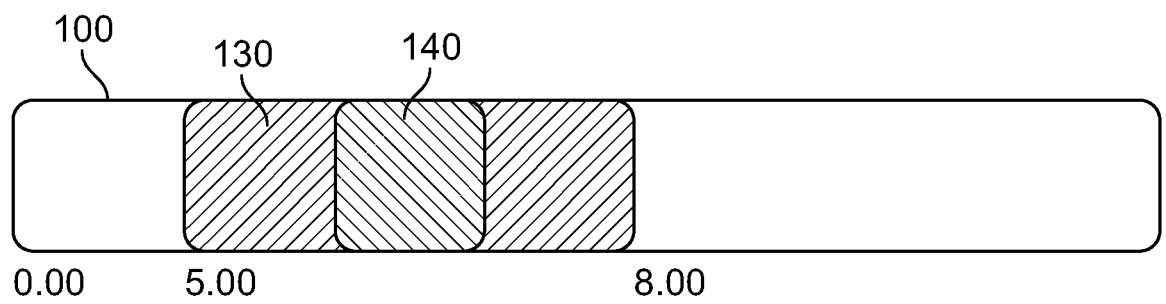
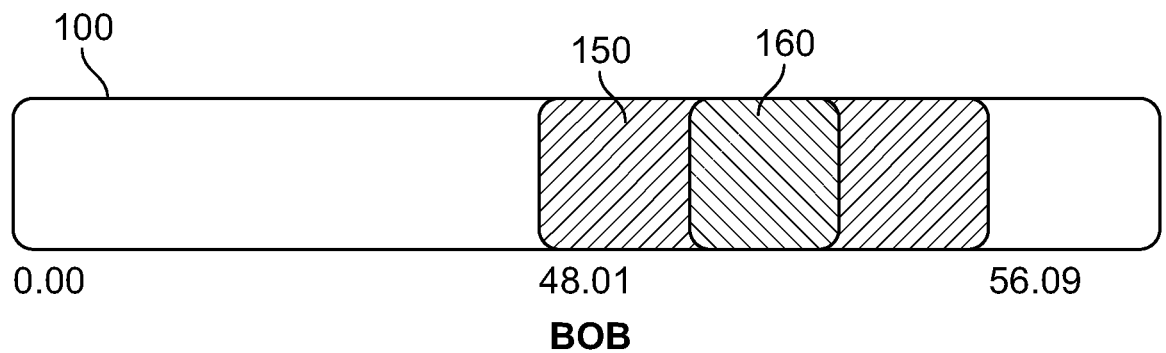
FIG. 1

700

PROFILE DATA

```
<INFORMATION FILE>
710  <USER_PROFILE_DATA>
     720  <USER>JOHN</USER>
          <GENDER>MALE</GENDER>
          <AGE>32</AGE>
          <ID>17214132</ID>
730  </USER_PROFILE_DATA>
     <USER_CONTENT_DATA>
     740  <MEDIA1>
          <META DATA>
          741  <CONTENTTYPE>MOVIE</CONTENTTYPE>
          742  <TITLE>WAR OF THE WORLDS</TITLE>
          743  <GENRE>SCIFI</GENRE>
          744  <HASHCODE>FF0A1342</HASHCODE>
               </METADATA>
          </MEDIA1>
     750  <MEDIA2>
          751  <MEDIAID>17232719</MEDIAID>
          752  <MEDIAHASH>F0AF6666</MEDIAHASH>
          753  <DATESTAMP>10/10/2012</DATESTAMP>
          754  <TIMESTAMP>10:30PM</TIMESTAMP>
               </MEDIA2>
     760  <MEDIACHANNEL1>
          761  <SUBSCRIPTION>1 MONTH</SUBSCRIPTION>
          762  <MEDIAHASH>1EEECAFC</MEDIAHASH>
          </MEDIACHANNEL1>
     </USER_CONTENT_DATA>
<INFORMATION FILE>
```

FIG. 7

SYSTEMS AND METHODS FOR PERSONALIZED TIMING FOR ADVERTISEMENTS

BACKGROUND

A user may be presented with advertisements during media content being viewed. The point in time within the media content at which the advertisement is presented to the user may be based on content that the content provider thinks is most interesting to one or more users. However, the portion of the content that is considered to be the most interesting for presentation of the advertisement is not necessarily the portion of the content that the user considers to be interesting.

SUMMARY

Systems and methods are provided herein for determining timing for generating for display an advertisement in a media asset based on a user profile is described herein. The media asset may be parsed into a plurality of time segments. A plurality of metadata items associated with content in each of the plurality of time segments of the media asset may be retrieved. In some embodiments, the metadata items may be retrieved from a server. The user profile corresponding to the user may also be retrieved. The retrieved plurality of metadata items and the user profile may be compared. Based on the comparison, a time segment of the plurality of time segments of the media asset that matches at least a portion of the user profile may be determined, and based on the determination an advertisement may be generated for display during the determined time segment of the media asset. Alternatively, and/or in addition, the advertisement may be generated for display before or after, but still in close temporal proximity, to the determined time segment during which the user is engaged.

In some embodiments, the comparison of the retrieved plurality of metadata items and the user profile may be performed by a server. This comparison may include searching each of the retrieved plurality of metadata items for a content characteristic preferred by the user. Preferred content characteristics may be included in the user profile. Examples of content characteristics include genres of content, such as action, romance, drama, comedy, actors, actresses, specific pieces of content preferred by the user, and any other suitable criteria.

In some embodiments, in addition to retrieving the user profile and comparing the plurality of metadata items of the media asset to the user profile, social media data corresponding to the user may also be accessed. The accessed social media data may be compared to the retrieved plurality of metadata items. Based on this comparison, a second time segment of the plurality of time segments of the media asset may be determined. Based on this determination, an advertisement may be generated for display during the second time segment of the time media asset.

In some embodiments, the comparison of the user profile and the retrieved plurality of the metadata items of the media asset may be performed for a media asset that the user is currently viewing. In addition, a first advertisement may be generated for display in lieu of a second advertisement, where the second advertisement is included for presentation in a second time segment of the media asset by a content provider of the media asset. For example, if the second advertisement was included in the time segment from 5.00 to 6.00 minutes of the media asset by the content provider and the media guidance application determines that based on the user's profile it would be more appropriate to display an advertisement from the time segment at 49.00 to 55.00 minutes of the media asset, then the second advertisement included by the content provider in the media asset may not be displayed and only the advertisement determined to be appropriate based on the user's profile may be displayed.

In some embodiments, the time point in the media asset determined to be suitable for presentation of an advertisement to this user may be different from the time point in a media asset determined to be suitable for display of an advertisement to a second user. For example, if the second user has content characteristics in her user profile that are different from the content characteristics in the user profile of the first user, then the time point in the media asset determined to be suitable for presentation of an advertisement to this user may be different from the time point in a media asset determined to be suitable for display of an advertisement to a second user. When the first and the second user are watching the same media asset on a shared screen, the media guidance application may present a first advertisement at a first time point in the media asset determined to be suitable for presentation of the first advertisement to the first user as well as present a second advertisement at a second time point in the media asset determined to be suitable for presentation of the second advertisement to the second user.

In some embodiments, the media guidance application may request an advertisement from an advertisement source. The advertisement source may be a content source that provides the media asset being consumed by the user, a content source that does not provide the media asset being consumed by the user, an online advertising data base, or any other suitable provider of advertising content.

In some embodiments, a first time segment of the media asset may be determined as being suitable for presenting an advertisement to the user based on the user's profile. A user's level of engagement in the determined time segment of the media asset may be determined by the media guidance application. If it is determined that the user's level of engagement in the determined time segment exceeds a threshold engagement level, then the user may be determined to be engaged in that time segment. If the user's determined level of engagement exceeds a threshold engagement level for the media asset, the advertisement may be generated for display during the determined time segment. For example, if a time segment 5.00 to 8.50 minutes of the media asset is determined to be appropriate for generating for display the advertisement to the user based on the user's profile and it is further determined that the user is currently engaged with the media asset during the time segment 5.00 to 8.50 minutes of the media asset, then the advertisement may be generated for display to the user during the determined time segment. If it is determined that the user is not engaged in the media asset in the determined time segment of the media asset, then the advertisement may not be generated for display to the user.

In some embodiments of the invention, if it determined that the user is not engaged in the time segment of the media asset determined to be appropriate for displaying an advertisement of the user based on the user's profile, then the advertisement may still be presented to the user. For example, the advertisement presented to the user in such situations may be may have a lower cost basis.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 depicts an illustrative embodiment of user personalized timing for advertisements, in accordance with some embodiments of the disclosure;

FIG. 7 depicts an illustrative data structure for storing user profile information, in accordance with some embodiments of the disclosure.

DETAILED DESCRIPTION

Figure 2:
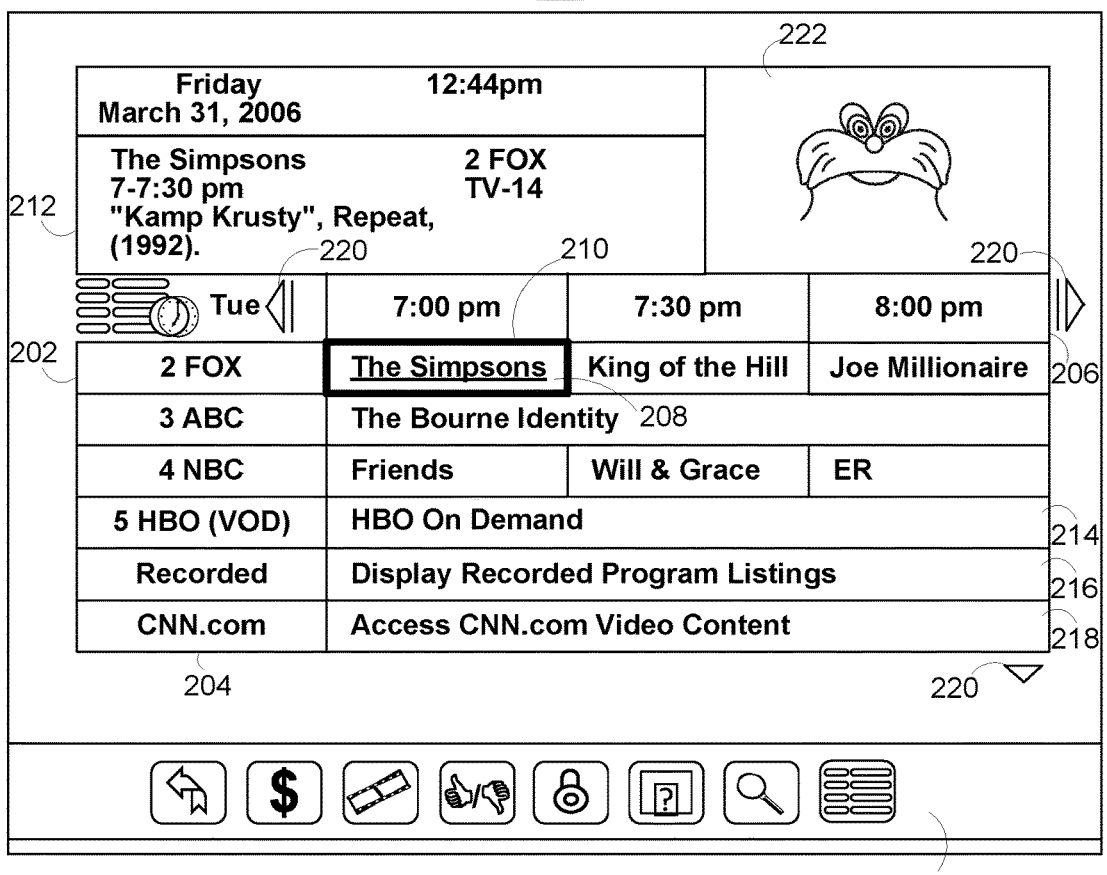
FIG. 2 shows an illustrative embodiment of a display screen that may be used to provide media guidance application listings and other media guidance information, in accordance with some embodiments of the disclosure.

FIG. 1 depicts an illustrative embodiment of user personalized timing for advertisements, in accordance with some embodiments of the disclosure.

Timing diagram 100 of FIG. 1 corresponds to the time duration of the media asset. Timing diagram 100 begins at 0.00 minutes. Time segment 110 of the media asset, from 15.30 through 18.50 minutes, may be determined to be an interesting portion of the media asset. For example, time segment 110 of the media asset, say the Twilight movie, may correspond to a romantic scene between Edward and Bella. An expert, potentially at the content provider providing the media asset, may determine that it's appropriate to display an advertisement during time segment 120 which may reside within time segment 110. This determination may be based on projected viewership levels or return on the advertising dollar.

To identify interesting portions of the media asset, the media asset may be parsed into several portions by the media guidance application. The portions may correspond to time segments of the media asset. The time segments may be uniform or not uniform. The time segments of the media asset may be processed to determine the content characteristics of each time segment of the media asset. For example, the media asset may be parsed into equal time segments of length 2.00 minutes. Alternatively, the media asset may be parsed into time segments of varying lengths. For example, while some time segments may be 2.00 minutes long, other time segments may be 10.00 minutes long. These time segment length values are merely exemplary and any other suitable time values may also be selected.

The time segments of the media asset may be processed to determine content characteristics of the media content within those time segments. Content characteristics such as the genre, e.g., action, drama, comedy, romance, science fiction, or any other suitable genre, may be determined. Other content characteristics may include the actors appearing in that time segment of the media asset, various objects depicted in that time segment of the media asset, various geographical locations appearing in that time segment, or any suitable combination thereof. Further content characteristics may include the mood of that particular time segment, e.g., whether content in that time segment of the media asset is happy, sad, or exciting.

For any given content characteristic, the time segments of the parsed media asset may be ranked based on the presence, absence, or amount of that content characteristic within a time segment. For example, if the content characteristic is "Tom Cruise," time segments in a parsed media asset may be ranked from highest to lowest based on the degree of presence of "Tom Cruise" within that media asset. In particular, the ranking of a time segment for the presence of "Tom Cruise" may be higher the longer Tom Cruise appears in that particular time segment, or the more frequently Tom Cruise is mentioned in that particular time segment.

The content characteristics determined by the media guidance application for the time segments of the parsed media asset may be indicated in metadata associated with the respective time segments of the media asset. For example, each time segment of the media asset processed by the media guidance application may be associated with metadata. The metadata may include entries for each content characteristic. For example, a time segment corresponding to an action sequence from a "Mission Impossible" movie may have metadata associated with "Tom Cruise" and action.

In timing diagram 100 of FIG. 1, the advertisement generated for display in time segment 120 may be displayed during, before, or after time segment 110. For example, the advertisement generated for display in time segment 120 may be displayed immediately before the start of time segment 110. That is, the advertisement may end at time 15.30 minutes. Alternatively, the advertisement may be generated for display within time segment 110. That is, time segment 120 may be completely encapsulated within time segment 110. In other words, time segment 120 may be some duration between 15.30 minutes and 18.50 minutes of the media asset. Alternatively, time segment 120 may occur immediately after the end of time segment 110. That is, the advertisement displayed within time segment 120 may begin at time 18.50 minutes of the media asset.

An expert may determine multiple advertisement insertion points within the media asset. That is, time segment 110 may not be the only interesting portion of the media asset within which it is appropriate to generate for display advertisements to a user according to the expert. There may be one or more such interesting time segments and advertisements may or may not be displayed within each of those interesting time segments of the media asset. An expert may be the content provider or a third party advertisement service.

Different users may find different things interesting. For example, the time segment 110 of the media asset determined to be interesting by the expert, and suitable for generating for display an advertisement, may not be considered to be interesting by other user. For example, if Bob is an adult male, he may generally be interested in action sequences. However, continuing the example from above, time segment 110 was marked interesting by the expert based on it's romantic content. Accordingly, Bob may not find time segment 110 interesting. On the contrary, based on Bob's preference for action sequences, Bob may find the wolf fighting scene beginning at 48.01 minutes of the media asset Twilight most interesting. As shown in timing diagram 100 at the bottom of FIG. 1, the time segment 150 depicts the wolf fighting scene. Accordingly, for Bob, it may be most appropriate to display advertisement within time segment 160 which is situated before, during or after time segment 150.

Bob's preference for action sequences may be indicated in Bob's user profile. Accordingly, time segments within a media asset most appropriate for displaying an advertisement to various users may be determined based on the user profile of those various users. It follows that the time segment during which an advertisement is displayed for various users may be different for each user. The user's profile may be determined by and maintained by the media guidance application. The user profile, as further discussed in connection with FIG. 7 below, may track various preferences or attributes of the user. Exemplary attributes include the user's age group, gender, likes, dislikes, interests, favorite genres, favorite actors, favorite locations, culture, and language. In addition, any other suitable user attribute may also be included in the user's profile.

The user's profile may be generated based on the user's inputs, that is, manual entries by the user. Alternatively the user profile may be generated automatically by the media guidance application by monitoring the user's interactions with the media guidance application and also including information culled from other sources. Other sources of information indicating the user's preferences may include social media information. For example, if a user indicates on Facebook that he is currently in a relationship, this information may be included in the user's profile by the media guidance application.

In some embodiments, time segment 110 predetermined by the expert for generating for display an advertisement to the user based on the interestingness of the time segment, may match the user's profile. For example, Alice may be a female teenager, and her user profile may indicate that she has a preference for a romantic content. In this situation, the romantic scene between Edward and Bella depicted in time segment 110 of the media asset and picked by the expert for generating for display an advertisement, may match Alice's user profile.

However, if Alice is not feeling quite herself, for example if she's feeling low or sad because she just went through a breakup, then she may not find romantic scenes interesting in that moment. It may be that in that moment, she may prefer to watch science fiction content.

In this situation, it may be determined that the science fiction scenes of the movie Twilight from 5.00 minutes through 8.00 minutes, corresponding to time segment 130, shown in the middle timing diagram 100 of FIG. 1, may be the most interesting time segments for Alice to be presented with an advertisement. Accordingly, an advertisement may be presented to Alice during time segment 140. Time segment 140 may be fully encapsulated within time segment 130 of timing diagram 100 of the media asset or time segment 140 may fall immediately before or immediately after time segment 130 of the media asset.

It is clear from the two examples discussed in detail above that the appropriate time segment within a media asset during which advertisement may be generated for display to user, may vary from user to user.

Moreover, even for a given user, the appropriate time segment of a media asset during which the advertisement may be generated for display to that user may change dynamically based on the user's mood, the user's level of engagement, the user's dopamine levels, the presence or absence of certain other people watching the media asset with that user, or any other suitable variety of factors. For example, even though Alice's profile may indicate that she prefers romantic content, if the media guidance application determines that Alice is really engaged in a car chase sequence in the movie "Mission Impossible," then the media guidance application may determine that it may be a good time point to generate for display an advertisement during the car chase sequence. In another example, even though Alice's profile may indicate that she prefers romantic content, if the media guidance application determines that Alice is watching media content with her husband, Bob, who prefers action sequences, then the media guidance application may avoid generating for display an advertisement during romantic sequences in the media content and may instead generate for display an advertisement during action-packed sequences of the media content. Alternatively, the media guidance application may generate for display an advertisement during both romantic and action sequences in the media content.

In some embodiments, accordingly, it may be important to measure Alice's level of engagement in the media asset. Alice's engagement may be measured in real time in variety of ways. For example, Alice's activity in front of the screen at which she's watching the media asset may be tracked through one or more sensors. Her mood may be determined through the monitoring of facial expressions, dopamine levels, or social media activity. Her level of engagement in the content may also be monitored through her facial expressions and her posture.

In some embodiments, an advertisement may be displayed to the user during a time segment of the media asset when the user's level of engagement is low. For example, if it is determined through real time monitoring of the user's activity, mood, posture, or any other suitable technique, that the user is currently not fully engaged in the media asset, e.g., because she is in reality checking her email, then an advertisement may nevertheless be displayed to the user.

The type of advertisement displayed to the user when the user's level of engagement in the media asset is low may be different than the type of advertisement displayed to the user when the user's level of engagement in the media asset is high. For example, if the user's current level of engagement in the media asset is low, advertisements that have a lower cost basis may be displayed to the user. A lower cost basis may imply that an advertiser has to pay a lower amount for placing that advertisement in the media asset.

In some embodiments, the time segment in the media asset determined to be suitable for generating for display an advertisement to a user by an expert may be replaced by an advertisement generated for display by the media guidance application in another time segment of the media asset determined based on the user's profile or level of engagement in the media asset. For example, an advertisement in time segment 140 of FIG. 1 may be added to the media asset in addition to the advertisement scheduled for presentation to the user during time segment 120 of FIG. 1. Alternatively, the advertisement to be generated for display in time segment 140 of FIG. 1 may be presented to the user in lieu of the advertisement to be generated for display to the user in time segment 120 of FIG. 1. That is, the advertisement in time segment 140 of FIG. 1 may replace the advertisement in time segment 120 of FIG. 1. In other instances, the user may be presented with advertisements in both time segments 120 and 140 of FIG. 1.

In some embodiments, an advertisement may be requested from another advertisement source for generating for display within the media asset. Advertisement sources are described in greater detail in connection with FIG. 5 below. For example, if a media asset is currently being viewed by the user on channel 1, with channel 1 being tuned to by the tuner, and another advertisement needs to be included for presentation in the media asset, based on the user's profile, in addition to the advertisement already included for presentation within the media asset by the content provider of the media asset, then another advertisement may be requested from another channel which could be tuned to by other tuner. In another example, if the media asset is being streamed from an over-the-top content provider, such as Hulu or YouTube, and another advertisement needs to be included for presentation within the media asset, then the other advertisement may be requested from another advertisement source. Exemplary advertisement sources include other channels than can be tuned to, over-the-top content providers, and advertisement data bases. For example, if the user is watching a video on YouTube, then another advertisement may be requested from Hulu. Similarly, on-demand advertisement data bases may also provide supplemental advertisements for inclusion within the media asset.

In some embodiments, the media guidance application may parse a media asset currently being watched by a user for determination of appropriate time segments to present an advertisement to the user. Alternatively, the media guidance application may parse the media asset scheduled to be watched by the user at a later date or currently recorded by the user for determining time segments appropriate for presenting an advertisement to a user for a media asset.

In some embodiments, when multiple users are watching the same media asset on a shared screen, then the user profiles or the engagement levels of all the users watching the media asset on the shared screen may be taken into consideration for determining appropriate time segments for generating for display an advertisement in a media asset. For example, if both Alice and Bob are watching the movie Twilight, and Bob's user profile indicates that he likes action sequences, and Alice's user profile indicates that she likes romantic sequences, then an advertisement may be presented to Alice and Bob in time segments of the media asset corresponding to both romantic sequences and action sequences. Alternatively, the media guidance application may determine time segments in the movie Twilight that are both romantic and action packed. Similarly, time segments within the media asset may be determined for presentation of an advertisement to the user based on the level of engagement exhibited by Alice and Bob in the media asset. For example, the media guidance application may present an advertisement only if both Alice and Bob are determined to be engaged in the media asset. Alternatively, an advertisement may be presented if at least one of Alice and Bob are determined to be engaged in the media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 3:
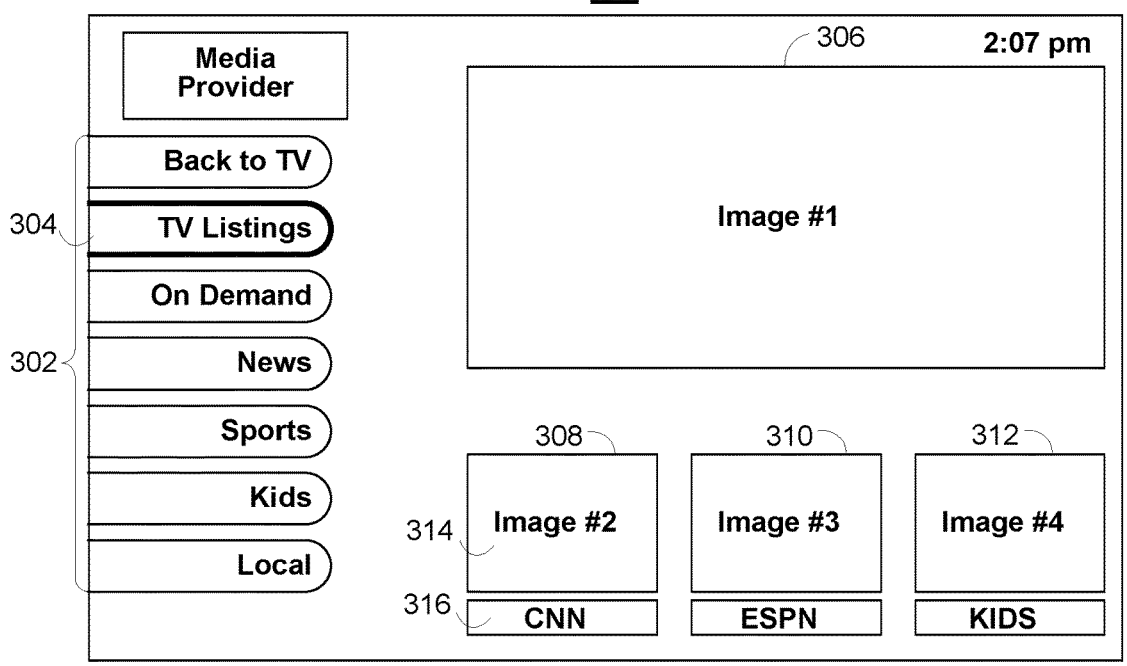
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

The time point within a media asset at which advertisement 224 may be generated for display to the user may be determined by the media guidance application based on the user's profile information or level of engagement with the media asset.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 4:
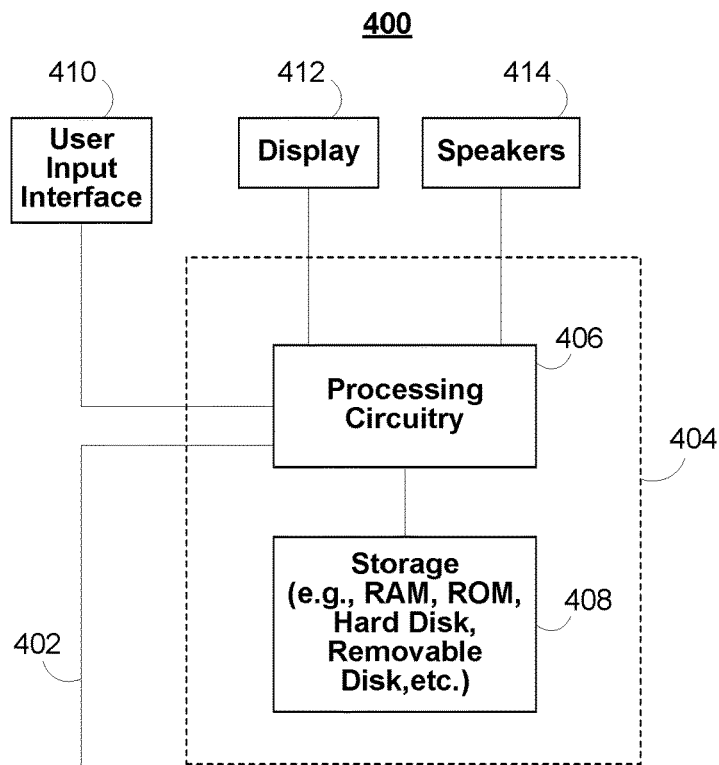
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
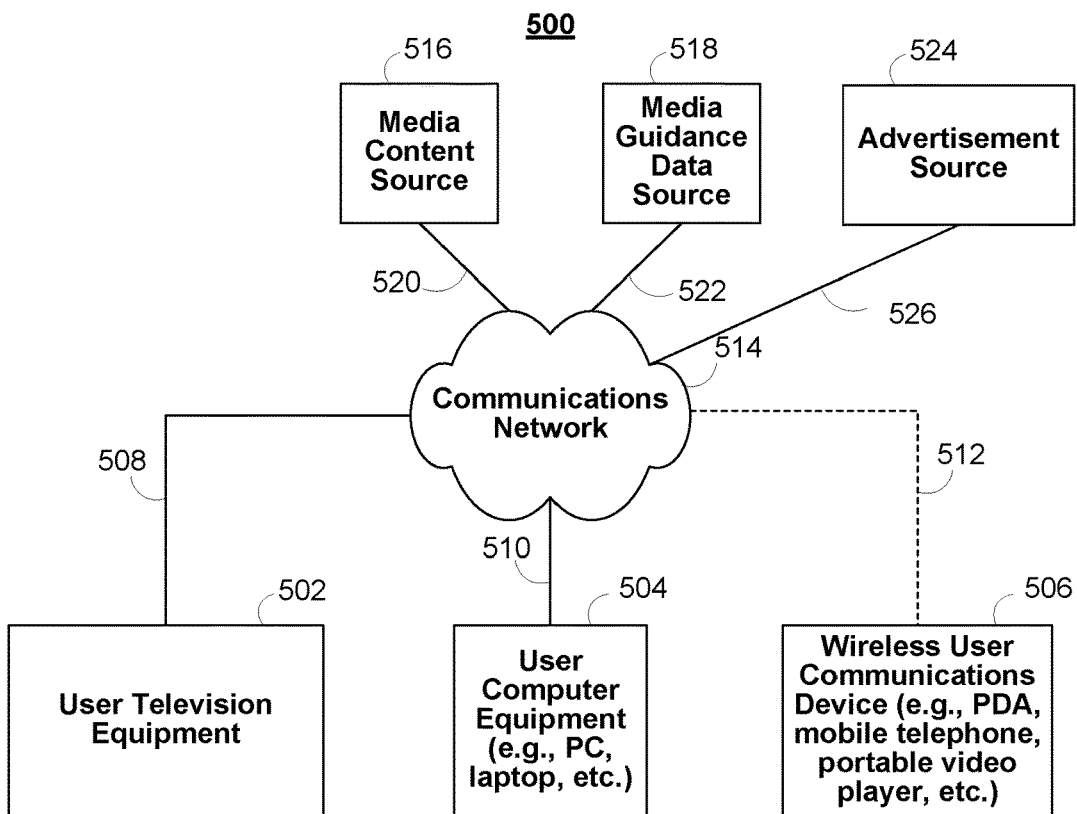
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source 524 may target advertisements based on the demographics of users known to view a particular show (e.g., teenagers viewing a reality show). As yet another example, advertisement source 524 may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Advertisement source 524 may additionally be capable of providing advertisements to the media guidance application upon request from the media guidance application as described in detail in connection with FIG. 1 above.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
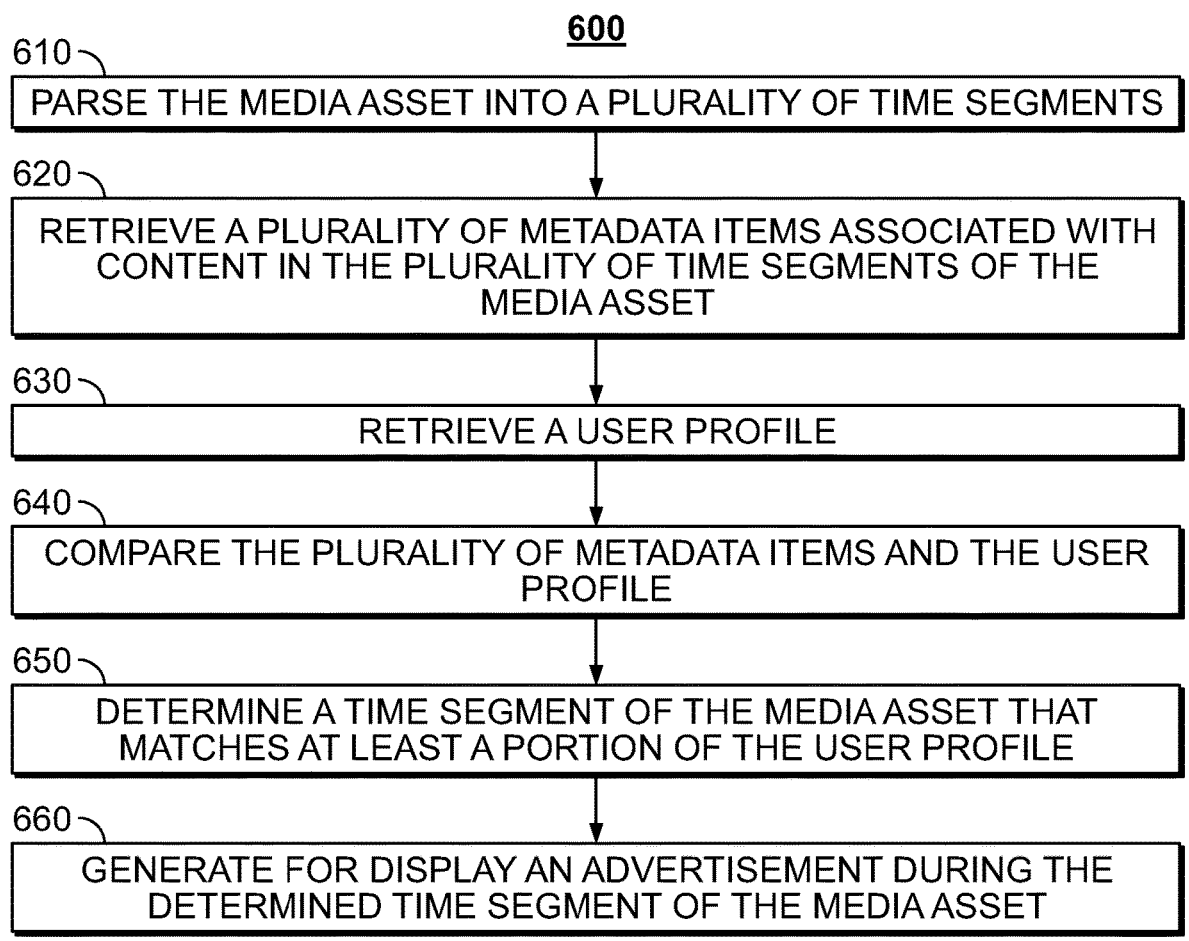
FIG. 6 depicts an illustrative flowchart of a process for generating for display an advertisement at a time point in a media content that is personalized to the user, in accordance with some embodiments of the disclosure.

FIG. 6 depicts an illustrative flowchart of a process for generating for display an advertisement at a time point in a media content that is personalized to the user, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 100 and/or 110, each of which may have any or all of the functionality of user television equipment 502, user computer equipment 504, and/or wireless communications device 506), or of a remote server separated from the user equipment by way of communications network 514.

Process 600 begins at 610, where control circuitry 404 may parse, using a media guidance application, a media asset into a plurality of time segments. The manner in which control circuitry 404 parses a media asset is described above with respect to FIG. 1, and such description is equally applicable to 610. For example, the media asset may be partitioned into multiple time segments of uniform or non-uniform length.

At 620, control circuitry 404 may retrieve, using a media guidance application, a plurality of metadata items associated with content in the plurality of time segments of the media asset. The manner in which control circuitry 404 retrieves the plurality of metadata items is described above with respect to FIG. 1, and such description is equally applicable to 620. For example, the media guidance application or a third party service may associate each of the time segments corresponding to the media asset parsed in 610 with metadata. The metadata associated with a given time segment may include content characteristics associated with media content within that time segment. Metadata associated with each of the time segments may be stored in storage 408 or in memory at a remote server. Control circuitry 404 may accordingly retrieve the metadata from storage 408 or the remote server.

At 630, control circuitry 404 may retrieve, using a media guidance application, a user profile. The manner in which control circuitry 404 retrieves the user profile is described above with respect to FIG. 1, and below with respect to FIG. 7, and such description is equally applicable to 630.

At 640, control circuitry 404 may compare, using a media guidance application, the plurality of retrieved metadata items and the user profile. The manner in which control circuitry 404 performs the comparison is described above with respect to FIG. 1, and such description is equally applicable to 640.

At 650, control circuitry 404 may determine, using a media guidance application, a time segment of the media asset that matches at least a portion of the user profile. The manner in which control circuitry 404 determines the time segment is described above with respect to FIG. 1, and such description is equally applicable to 650. For example, if the media guidance application determines that the metadata (e.g., romantic content) associated with time segment 130 in FIG. 1 matches one or more portions of the user's profile information (e.g., Alice's user profile information indicates that she is a female teenager who likes romance and sci-fi), then time segment 130 may be determined to be a suitable time segment for presenting an advertisement to the user.

At 660, control circuitry 404 may generate for display, using a media guidance application, an advertisement during the time segment, determined at 650, of the media asset. The manner in which control circuitry 404 generates for display the advertisement is described above with respect to FIG. 1, and such description is equally applicable to 660.

FIG. 7 illustrates an example of a data structure for storing user profile information, in accordance with an embodiment of the invention. The manner in which control circuitry 404 utilizes user profile information is described above with respect to FIG. 1, and such description is equally applicable to the data structure described in FIG. 7.

The data structure may store information about the identity of the user and information corresponding to the user's profile. The data structure may include user profile information section 710 containing user profile data 720. In some implementations, the data structure may include section 730 that contains user preference information. Section 730 may include preference information for media content 740, 750, and 760.

User profile information section 710 is used to identify the user. Upon identifying the user watching media content, the media guidance application may use user profile information section 710 to identify the user profile information corresponding to the user watching the media content. Section 710 may include descriptive information 720 about a user such as user ID number, name, gender, and age. The user ID number may be a unique number assigned to identify a user. Examples of such ID numbers may include national identity card numbers, social security numbers, passport numbers, or a hash code generated from the full name and birth date of the user.

Section 730 may include content information which describes access to media content and preference information. The information in section 730 may be used by the media guidance application to retrieve user preferences and attributes needed to make a determination of a suitable time point in a media asset for presenting an advertisement to the user. For example, information contained in section 730 of the user profile information may be compared against metadata associated with time segments of the media asset parsed by the media guidance application in 640 of process 600.

The access information may describe the user's past or present access to one or more media content. It may include media content the user is subscribed to. The term subscription may refer to any grouping of media content that is provided by a media content service provider for a period of time, and that depend on the terms of a service agreement between a user and the copyright owner or distributor. For example, a user may be subscribed to access the entire television series of Battlestar Galactica, indicating that the user prefers drama, sci-fi, any of the actors involved with Battlestar Galactica, or specifically this particular series. Such user preferences may also be indicated in section 730. For example, the user may be subscribed to a sports broadcast package that grants access to a number of pay-per-view shows or a number of sports channels, indicating that the user prefers sports or particular types of movies.

Subscription information may include an ID number of the user, an account number with a service provider, a duration of the subscription, and a hash code. For example, the user may be subscribed to the NBC Sports Network, indicating that the user prefers sports. The ID number may be used to verify the identity of the user and the account number may be used to verify the services subscribed by the user. The duration may indicate the length of the subscription from a start date of service, expiration date of the service, time remaining available in the subscription, any other suitable duration information or any combination thereof. The longer a user has been subscribed, the more strongly might that user prefer the type of content offered by that subscription service. The hash code may be a unique number assigned to the user that is compared with a value stored on a central server. The hash code is only valid for the duration of the subscription. After the subscription has expired, the user will need to renew the subscription and obtain a new hash code in order to continue maintaining access to the subscribed services. Possession of the information listed above will enable a device the user is using to access the media content with which the subscription is associated.

Listing 740 is an example of access to a media content described by metadata, which may include information that describes a media content such as the content type, title, genre, composer, author, performer, file size, and time length of the media asset. The information in listing 740 may be used by the media guidance application to retrieve user preferences and attributes needed to make a determination of a suitable time point in a media asset for presenting an advertisement to the user. Listing 740 provides example access information described by metadata. The listing describes a media content having a content type 741 of movie, title 742 of "War of the Worlds," and genre 743 of sci-fi, indicating that the user prefers sci-fi. Hash codes may be used to securely protect metadata stored in plain text from tampering by unauthorized users.

In some implementations, control circuitry 404 may compute the hash code 744 as the result of hashing a concatenation of the metadata 741-743, using a hashing algorithm only usable by control circuitry 404. Modification of the plain text metadata in listing 740 without modification of the hash code would corrupt the information in the listing 740.

Listing 750 is an example of access information corresponding to access to a media content described without metadata. The information in listing 750 may be used by the media guidance application to retrieve user preferences and attributes needed to make a determination of a suitable time point in a media asset for presenting an advertisement to the user. Listing 750 includes an ID number 751, hash code 752, date stamp 753, and time stamp 754. ID number 751 may be a unique ID number for the media asset. Date stamp 753 and time stamp 754 may indicate a date and time at which the media content was accessed. Hash code 752 may be a hashed value of an ID number, date information, time information, user profile information, any other suitable content authorization information or subscription information or any combination thereof. The hash code may prevent against tampering of the access right.

Listing 760 is an example of an access to a channel. The information in listing 760 may be used by the media guidance application to retrieve user preferences and attributes needed to make a determination of a suitable time point in a media asset for presenting an advertisement to the user. The listing may include subscription term 761, which indicates the duration of the subscription. Other variants of 761 may include one-time, annual or seasonal. Hash code 762 may be a hashed value of an ID number, date information, time information, user profile information, any other suitable content authorization information or subscription information or any combination thereof. In this case, only the hashed value is stored to reduce the amount of information about the access right that needs to be stored or transmitted. It should be understood that other variants and combinations of the information described previously may also be used to describe media content accessed by, and/or preferred by the user.

In some implementations, data structure 700 may also include fields (not shown) for encapsulating user preference information or demographic information directly. For example, if the user has interacted with an e-mail, text message, reminder, calendar event, bookmark, screenshot, media content recommendation, and game request setting, or any other individual data item, data structure 700 may include a field to contain the relevant information.

Figure 8:
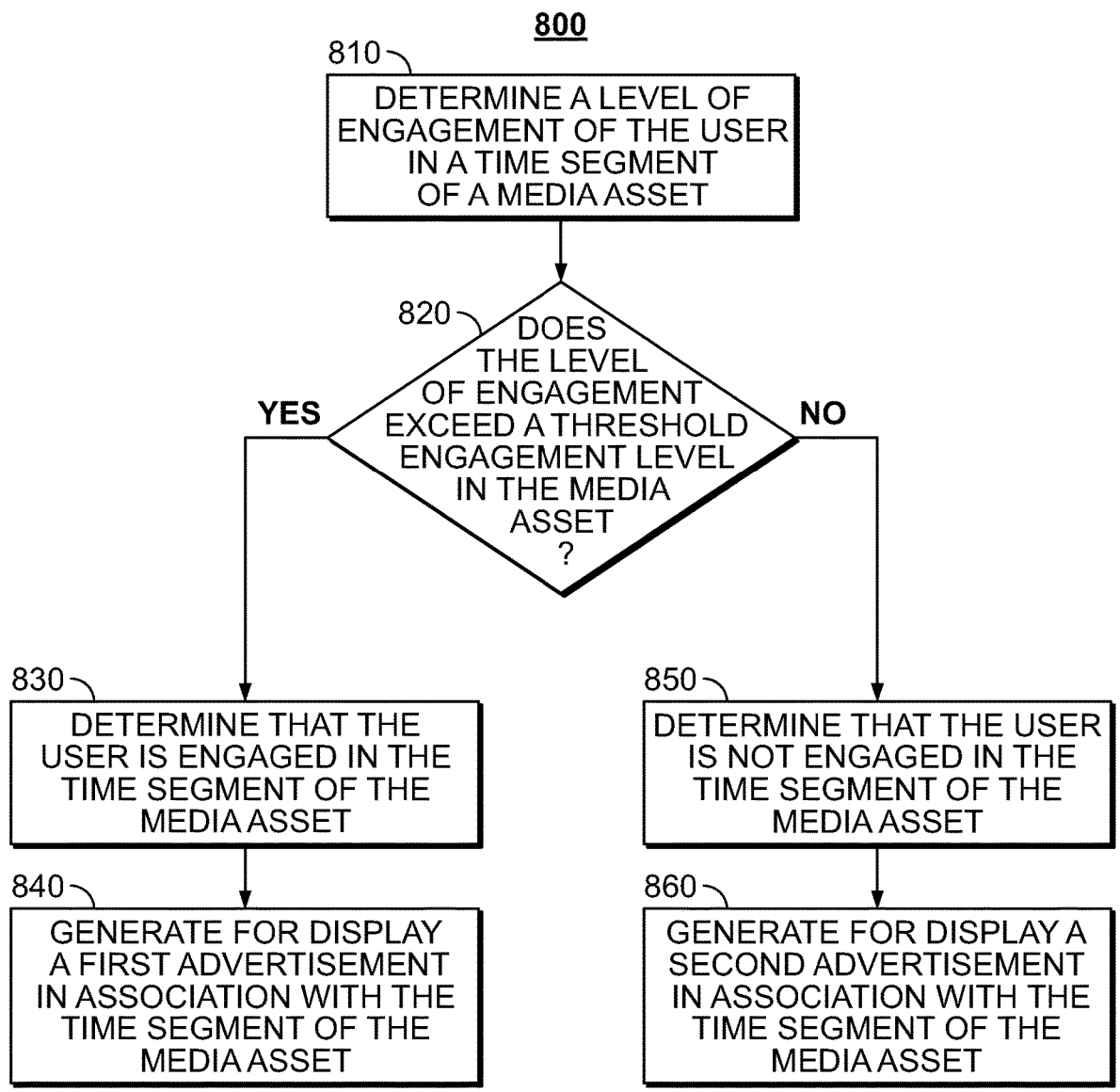
FIG. 8 depicts an illustrative flowchart of a process for determining which candidate advertisement to generate for display based on the user's level of engagement with the media asset, in accordance with some embodiments of the disclosure.

FIG. 8 depicts an illustrative flowchart of a process for determining which candidate advertisement to generate for display based on the user's level of engagement with the media asset, in accordance with some embodiments of the disclosure. Process 800 may be executed by control circuitry 404 (e.g., in a manner instructed to control circuitry 404 by the media guidance application). Control circuitry 404 may be part of user equipment (e.g., user equipment 100 and/or 110, each of which may have any or all of the functionality of user television equipment 502, user computer equipment 504, and/or wireless communications device 506), or of a remote server separated from the user equipment by way of communications network 514.

Process 800 begins at 810, where control circuitry 404 may determine, using the media guidance application, a level of engagement of the user in a time segment of a media asset. The manner in which control circuitry 404 performs the determining of the level of engagement of the user in a time segment of a media asset is described above with respect to FIG. 1, and such description is equally applicable to 810.

At 820, control circuitry 404 may determine, using the media guidance application, whether the level of engagement exceeds a threshold engagement level in the media asset. For example, in order to make this determination, the media guidance application may retrieve a threshold value corresponding to the threshold engagement level for the media asset from storage 408. Exemplary threshold values may range from a value corresponding to the user being fully engaged with the media asset to the user not being engaged at all with the media asset.

If the level of engagement in fact exceeds a threshold engagement level in the media asset, process 800 continues to 830, where control circuitry 404 determines that the user is engaged in that time segment of the media asst. At 840, control circuitry 404, using the media guidance application, generates for display a first advertisement in association with the time segment of the media asset. If the level of engagement does not exceed a threshold engagement level in the media asset, process 800 continues to 850, where control circuitry 404 determines that the user is not engaged in that time segment of the media asst. At 860, control circuitry 404, using the media guidance application, generates for display a second advertisement in association with the time segment of the media asset. The manner in which control circuitry 404 performs the elements of 820-860 is described above with respect to FIG. 1, and such description is equally applicable to 820-860.

It should be noted that processes 600 and 800 or any step thereof could be performed on, or provided by, any of the devices shown in FIGS. 4-5. For example, any of processes 600 and 800 may be executed by control circuitry 404 (FIG. 4) as instructed by control circuitry implemented on user equipment 502, 504, 506 (FIG. 5), and/or a user equipment for selecting a recommendation. In addition, one or more steps of processes 600 and 800 may be incorporated into or combined with one or more steps of any other process or embodiment.

It is contemplated that the steps or descriptions of each of FIGS. 6 and 8 may be used with any other embodiment of this disclosure. In addition, the steps and descriptions described in relation to FIGS. 6 and 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6 and 8.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining planned activities of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of the home security application, such as volume settings or time restriction settings, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for determining timing for displaying an advertisement based on a user profile corresponding to a user, the method comprising;
    parsing a video asset into a plurality of equal time segments;
    providing, using a control circuitry, a digital stream or video on demand (VOD) video asset to a display device for display to the user, wherein the digital stream or VOD video asset comprises the video asset;
    providing a sensor configured to capture facial expressions of the user;
    retrieving, from a server, a plurality of metadata items corresponding to content within each of the plurality of equal time segments of the video asset, wherein the metadata items comprise content characteristics of the content within each of the plurality of equal time segments of the video asset;
    retrieving the user profile;
    comparing the retrieved plurality of metadata items and the user profile;
    ranking each of the equal time segments based on the respective content characteristics;
    determining, based on the comparison, a first time segment of the plurality of equal time segments of the video asset that matches at least a portion of the user profile;
    scheduling, based at least in part on the determination, the advertisement to be displayed during the first time segment of the video asset;
    capturing facial expressions of the user by the sensor in a second time segment of the plurality of equal time segments of the video asset, wherein no advertisements are scheduled for the second time segment and wherein the second time segment precedes the first time segment;
    determining a level of engagement of the user in the second time segment based on the facial expressions;
    determining that the level of engagement of the user in the second time segment of the plurality of the equal time segments exceeds a threshold engagement level for the video asset; and
    in response to determining that the level of engagement in the second time segment of the plurality of the equal time segments exceeds the threshold engagement level for the video asset, generating for display the advertisement during a display of the second time segment of the video asset on the display device instead of during the determined first time segment of the video asset.

2. The method of claim 1, wherein the comparing is performed by the server and the comparing further comprises:
    searching each of the retrieved plurality of metadata items for a content characteristic preferred by the user, wherein the content characteristic is included in the user profile.

3. The method of claim 1, further comprising:
    accessing social media data corresponding to the user;
    comparing, the retrieved plurality of metadata items and the accessed social media data;
    determining, based on the comparison, a fourth time segment of the plurality of equal time segments of the video asset that matches the social media data; and
    generating for display the advertisement during the fourth time segment of the video asset.

4. The method of claim 1, wherein:
    the user is currently viewing the video asset;
    the advertisement is a first advertisement; and
    the first advertisement is generated for display in lieu of a second advertisement, the second advertisement being included in a fourth time segment of the video asset by a content provider of the video asset.

5. The method of claim 1, wherein the user is a first user, further comprising:
    retrieving a user profile corresponding to a second user;
    comparing the retrieved plurality of metadata items and the user profile corresponding to the second user;
    determining, based on the comparison, a fourth time segment of the plurality of equal time segments of the video asset that matches the user profile corresponding to the second user; and
    generating for display the advertisement during the fourth time segment of the video asset.

6. The method of claim 5, wherein the first user and the second user are concurrently watching the video asset on a same display device.

7. The method of claim 1 further comprising:
requesting the advertisement from an advertisement source.

8. The method of claim 7, wherein the advertisement source is at least one of a content source that provides the video asset, a content source that does not provide the video asset, and an online advertising database.

9. The method of claim 1, wherein the level of engagement is determined by tracking user activity in front of a display screen on which the video asset is being generated for display.

10. A system for determining timing for displaying an advertisement based on a user profile corresponding to a user, the system comprising:
a sensor configured to capture facial expressions of the user; and
control circuitry configured to:
parse a video asset into a plurality of equal time segments;
provide, to a display device, a digital stream or video on demand (VOD) video asset for display to the user, wherein the digital stream or VOD video asset comprises the video asset;
retrieve, from a server, a plurality of metadata items as corresponding to content within each of the plurality of equal time segments of the video asset, wherein the metadata items comprise content characteristics of the content within each of the plurality of equal time segments of the video asset;
retrieve the user profile;
compare the retrieved plurality of metadata items and the user profile;
ranking each of the equal time segments based on the respective content characteristics;
determine, based on the comparison, a first time segment of the plurality of equal time segments of the video asset that matches at least a portion of the user profile;
schedule, based at least in part on the determination, the advertisement to be displayed during the first time segment of the video asset;
capturing facial expressions of the user the sensor in a second time segment of the plurality of equal time segments of the video asset, wherein no advertisements are scheduled for the second time segment and wherein the second time segment precedes the first time segment;
determine a level of engagement of the user in the second time segment based on the facial expressions;
determine that the level of engagement of the user in the second time segment of the plurality of the equal time segments exceeds a threshold engagement level for the video asset; and in response to determining that the level of engagement in the second time segment of the plurality of the equal time segments exceeds the threshold engagement level for the video asset, generate for display the advertisement during display of the second time segment of the video asset on the display device instead of during the determined first time segment of the video asset.

11. The system of claim 10, wherein the control circuitry is further configured to:
search each of the retrieved plurality of metadata items for a content characteristic preferred by the user, wherein the content characteristic is included in the user profile.

12. The system of claim 10, wherein the control circuitry is further configured to:
access social media data corresponding to the user;
compare the retrieved plurality of metadata items and the accessed social media data;
determine, based on the comparison, a fourth time segment of the plurality, of equal time segments of the video asset that matches the social media data; and
generate for display the advertisement during the fourth time segment of the video asset.

13. The system of claim 10, wherein:
the user is currently viewing the video asset;
the advertisement is a first advertisement; and
the first advertisement is generated for display in lieu of a second advertisement, the second advertisement being included in a fourth time segment of the video asset by a content provider of the video asset.

14. The system of claim 10, wherein the user is a first user, and the control circuitry is further configured to:
retrieve a user profile corresponding to a second user;
compare the retrieved plurality of metadata items and the user profile corresponding to the second user;
determine, based on the comparison, a fourth time segment of the plurality of equal time segments of the video asset that matches the user profile corresponding to the second user; and
generate for display the advertisement during the fourth time segment of the video asset.

15. The system of claim 14, wherein the first user and the second user are concurrently watching the video asset on a same display device.

16. The system of claim 10, wherein the control circuitry is further configured to:
request the advertisement from an advertisement source.

17. The system of claim 16, wherein the advertisement source is at least one of a content source that provides the video asset, a content source that does not provide the video asset, and an online advertising database.

18. The system of claim 10, wherein the control circuitry is configured to determine the level of engagement by tracking user activity in front of a display screen on which the video asset is being generated for display.

* * * * *